Figure 2A:
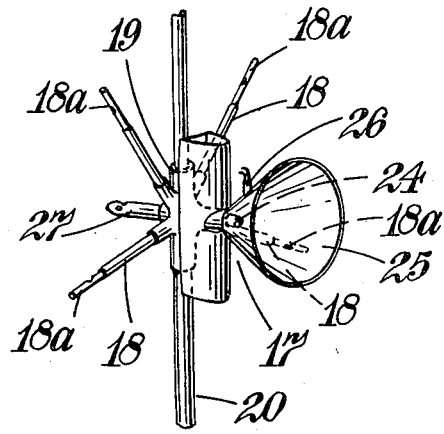

Nov. 27, 1956         A. C. LOVESEY         2,771,743
GAS-TURBINE ENGINE WITH REHEAT COMBUSTION EQUIPMENT
Filed Aug. 4, 1952                         4 Sheets-Sheet 1
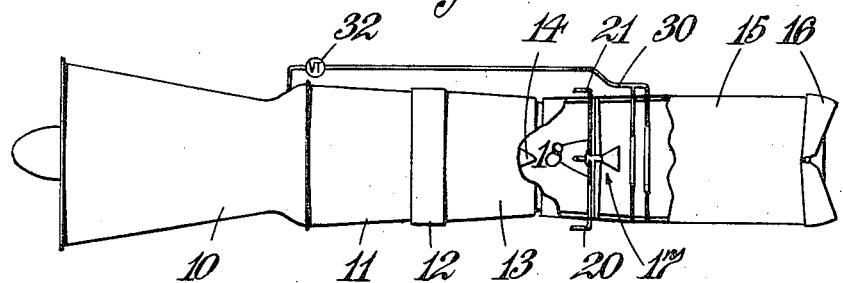
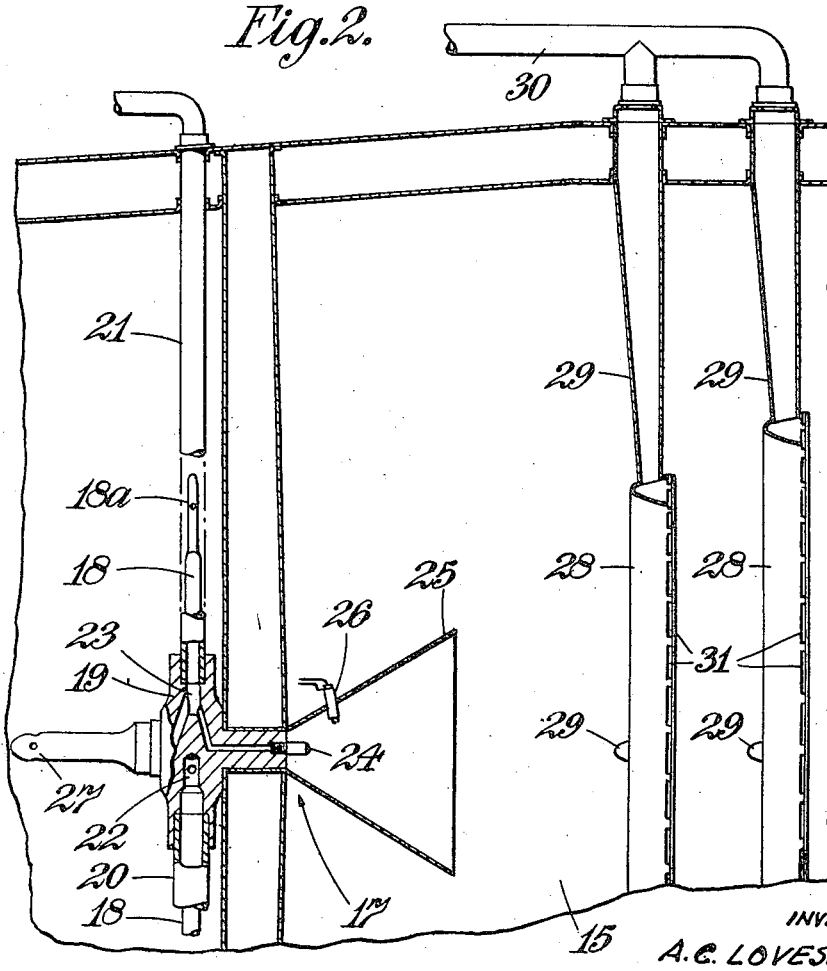
INVENTOR
A. C. LOVESEY
by Wilkinson & Mawhinney
Attorneys Inventor
A. C. LOVESEY

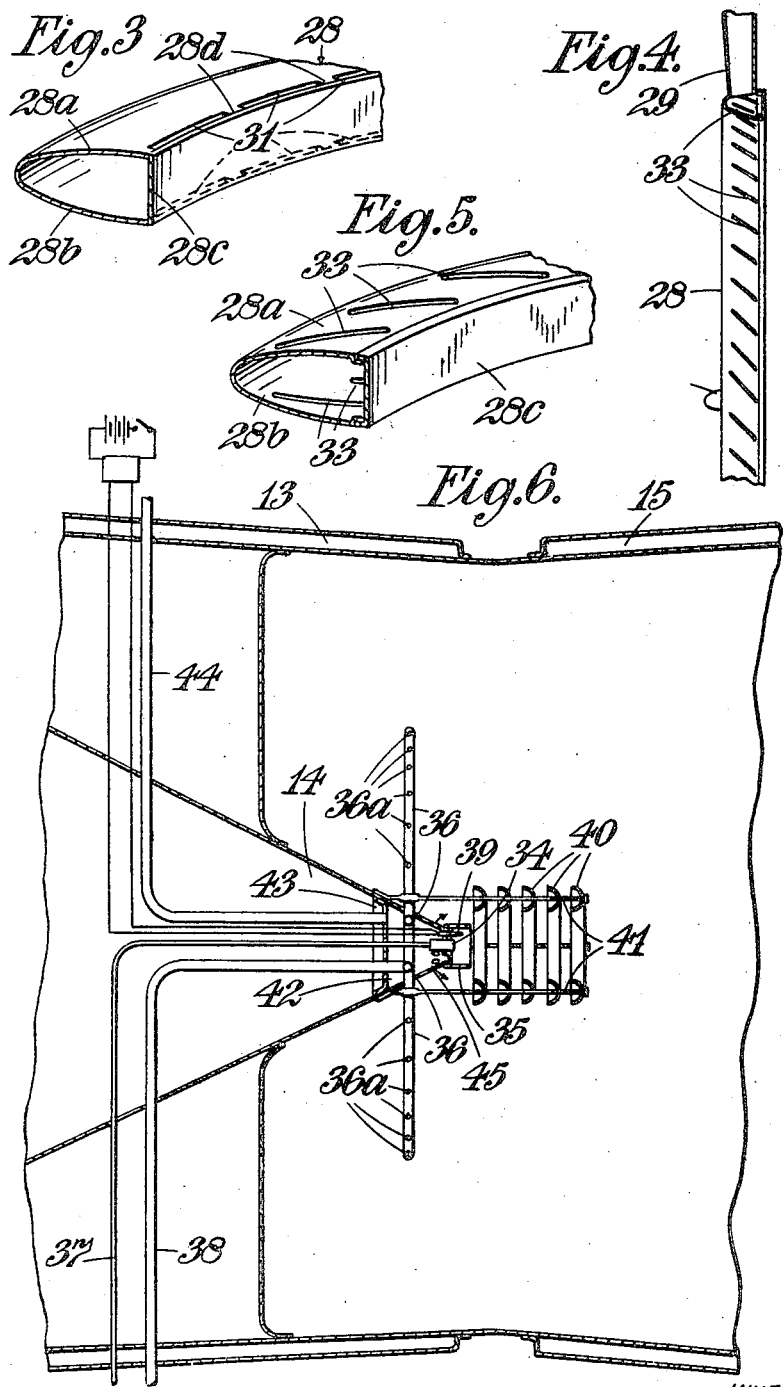

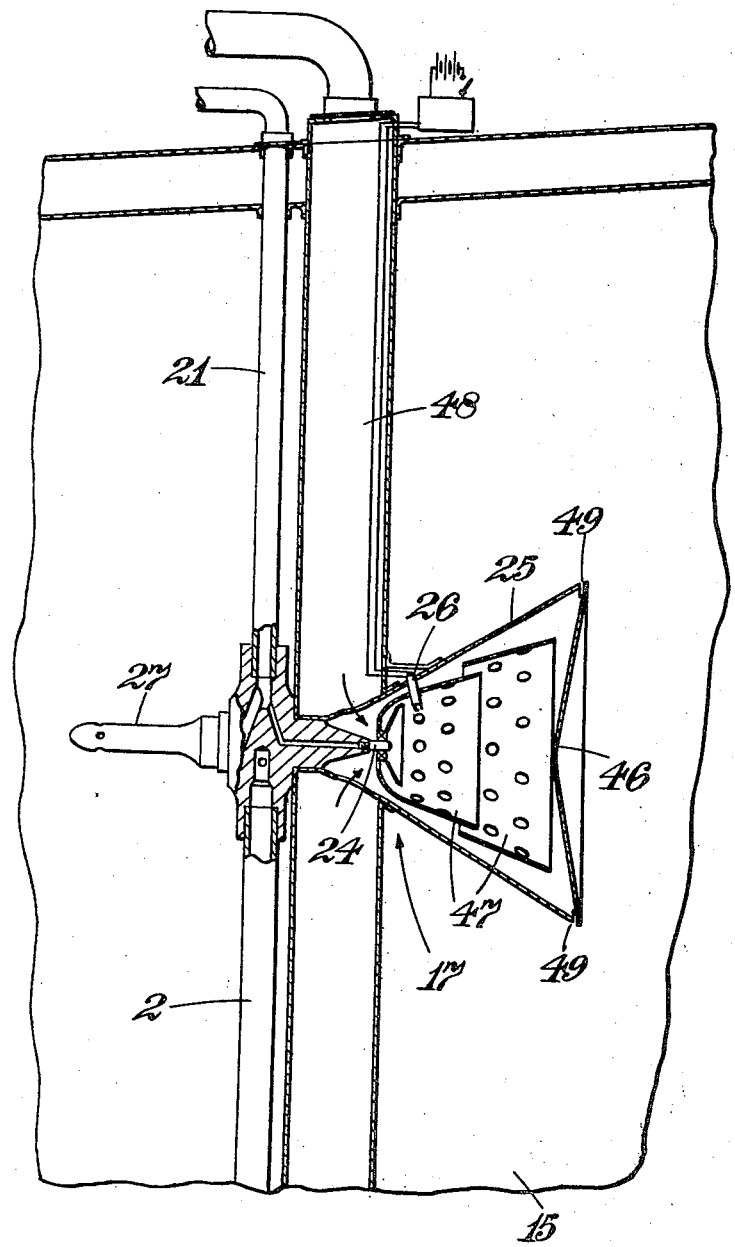

United States Patent Office 2,771,743
Patented Nov. 27, 1956

2,771,743

GAS-TURBINE ENGINE WITH REHEAT COMBUSTION EQUIPMENT

Alfred Cyril Lovesey, Littleover, England, assignor to Rolls-Royce Limited, Derby, England, a British company Application August 4, 1952, Serial No. 302,455

Claims priority, application Great Britain August 10, 1951

10 Claims. (Cl. 60—39.72)

This invention relates to combustion equipment of gas-turbine engines, and is more particularly concerned with combustion equipment through which flows a high-velocity hot gas stream which is to be further heated by burning fuel in the gas stream.

In gas-turbine engines, and more particularly in those used for aircraft propulsion, it is a common practice to burn fuel in the exhaust gases from a turbine system, for example, for the purpose of augmenting the propulsive thrust developed by the exhaust gases in emerging to atmosphere through a propelling nozzle. Likewise in certain marine or industrial gas turbine plants the working medium may be reheated between the stages of a turbine system, for which purpose it is necessary to provide combustion equipment for burning fuel in a high-velocity gas stream flowing between the turbine stages.

With combustion equipment provided for this purpose, it is desirable that the pressure losses should be low not only during the operation of the equipment, i. e. when fuel is being burnt, but also when the equipment is inoperative. The pressure loss attributable to the presence of the combustion equipment when it is inoperative is sometimes referred to as the "cold loss" and it is desirable that the cold loss should be kept low in order to reduce as far as possible the loss of the efficiency of the engine when the equipment is inoperative; thus in the case of an aircraft reaction propulsion engine, the combustion equipment may be operative only for a minor part of the running time of the engine, since the additional thrust which is made available by the use of the combustion equipment, is used mainly for emergency purposes.

It is an object of the present invention to provide combustion equipment of the kind specified in which the cold loss is not excessive and in which stable combustion in the high-velocity hot gas stream is more readily maintained than hitherto.

Combustion may be made more stable by locating baffle or stabilizing elements in the duct conveying the hot gas stream, and, in general, stability of combustion increases as the projected area of such elements on to a plane at right angles to the gas flow is increased; however, an increase of the projected area in general also increases the cold loss. Normally, therefore, it is necessary to select baffles or stabilizing elements having a projected area which is between those giving the very low cold loss and the high stability of combustion respectively.

According to the present invention, combustion equipment of a gas-turbine engine of the kind in which combustion is maintained in a high-velocity hot gas stream comprises a flame stabilizing device including means for injecting a jet or jets of air into the gas stream transversely of the direction of flow of the stream to establish on the downstream side of the air jet a stagnant or turbulent zone which assists to maintain combustion of fuel injected into the stream upstream of the air jet.

The air jet may be of substantially annular sheet form and may be produced by a plurality of circumferentially-extending slit orifices, or may be a number of sheet-like jets inclined to the direction of gas flow in the manner of vanes. If desired, the air providing the jet may be heated by combustion of fuel prior to its delivery through a jet orifice into the high-velocity hot gas stream.

An orifice for producing the air jet is preferably of slit form so as to produce a substantially continuous surface of air flowing into the high-velocity hot gas stream. The supply of air to the jet orifice and the effective area of the latter are preferably such that the orifice is choked in operation, whereby the velocity of the air emerging from the jet orifice approximates to the velocity of sound in the air at the temperature and pressure conditions existing in the throat of the orifice.

In one embodiment of the invention, the stabilizing device comprises a ring of tube formation, the ring being disposed in a plane transversely of the gas flow and on the downstream side of a ring of circumferentially-spaced fuel injectors; the stabilizing ring is provided with slot-like orifices which extend circumferentially on its inner and outer radially-facing surfaces and the interior of the stabilizing ring is connected to a source of air under pressure. With such an arrangement air jets emerging from slots at high velocity provide stabilizing zones for combustion on the downstream side of the ring for fuel introduced through the fuel injectors.

In previously known constructions a ring type stabilizer has been used which has a projected area transversely of the gas flow appropriate to maintain combustion; however, a ring stabilizer having a projected area appropriate to give acceptable combustion characteristics, gives rise to cold losses which are undesirably large. In the arrangement according to this feature of the present invention, the ring may have a relatively small projected area transversely of the gas flow, the effective area being increased, when it is desired to burn fuel in the gas stream, by the air jets which emerge from the ring transversely of the gas flow.

Some embodiments of this invention will now be described with reference to the accompanying drawings in which—

Figure 6A:
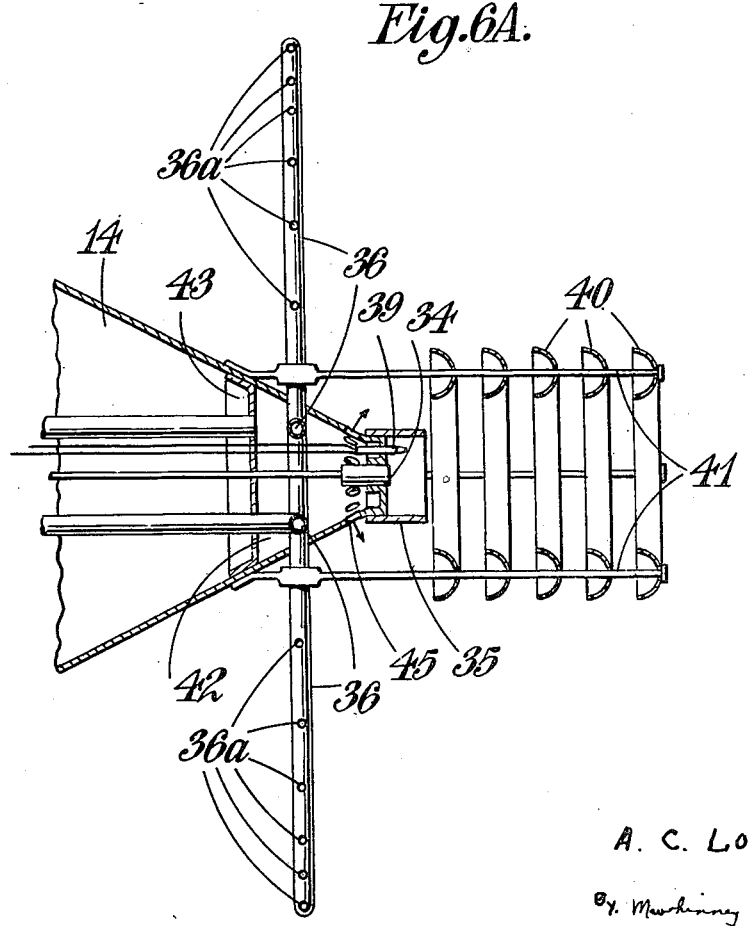

Figure 1 is a diagrammatic view of one form of gas-turbine engine with which the invention may be used, and showing parts of a construction of combustion equipment of this invention in position, Figure 2 is an enlarged view of part of the combustion equipment shown in Figure 1, Figure 2A is a perspective view of part of the combustion equipment shown in Figure 2, Figure 3 is a detail perspective view of part of the combustion equipment shown in Figure 2, Figure 4 illustrates a modified form for part of the combustion equipment of Figures 2 and 3, Figure 5 is a detail perspective view of the part shown in Figure 4, Figure 6 illustrates another construction of combustion equipment of this invention, Figure 6A is an enlarged view of part of the structure shown in Figure 6, and Figure 7 illustrates yet another construction of combustion equipment of this invention.

Referring to Figure 1, the gas-turbine engine illustrated is a simple gas turbine reaction propulsion engine in which combustion equipment is provided for effecting further heating of the hot exhaust gas as it flows from the turbine system to a propelling nozzle through which it passes to atmosphere. Such "reheat" combustion equipment is used for the purpose of augmenting the propulsive thrust of the engine.

The engine comprises a compressor system 10 which delivers compressed air to a main combustion system 11 from which the products of combustion pass through a turbine system 12 for driving the compressor system; the exhaust gases from the turbine system 12 flow into an exhaust unit comprising an outer wall 13 and inner conical wall 14 affording an annular passage leading to a jet pipe 15 in which is located the reheat combustion equipment 17 and which has at its outlet to atmosphere a propelling nozzle 16. The nozzle 16, as is usual in engines provided with reheat combustion equipment in the jet pipe, is shown as being adjustable in effective area.

The jet pipe 15 is conveniently of substantially circular section, and its cross-sectional area may, as shown, be increased locally in the region of reheat combustion equipment 17.

The reheat combustion equipment 17 as illustrated comprises fuel supply means of hitherto proposed form including a plurality of main fuel injectors in the form of tubes 18 radiating from a boss 19 disposed centrally within the jet pipe and supported by diametrically extending pipes 20, 21 of which pipe 20 delivers fuel to a bore 22 in the boss 19 leading to the inner ends of the tubes 18 and of which pipe 21 delivers fuel to a bore 23 leading to a pilot fuel injector 24 disposed centrally within the jet pipe 15 on the downstream side of the main fuel injectors 18. The pilot fuel injector 24 delivers fuel into a substantially conical baffle 25, within which is provided a fuel igniter device 26, for example of the electrical spark kind. The function of the pilot fuel injector 24 and conical baffle 25 is to provide a stable pilot flame thereby to facilitate ignition of the main fuel supply from tubes 18 and to assist in the maintenance of combustion of fuel injected through the tubes 18. Another fuel injector nozzle 27 fed with fuel from bore 23 may be provided upstream of the tubes 18, and fuel from this nozzle will assist to ensure ignition of the main fuel from tubes 18 by the pilot flame.

Downstream of the fuel injection means there is provided means to assist in stabilizing combustion of the fuel being delivered into the jet pipe 15 by means of the main fuel injection tubes 18. The stabilizing means comprises one or more annular members 28 supported from the wall of the jet pipe 15 by means of struts 29 to be in planes at right angles to the jet pipe axis. The stabilizing means has a diameter approximately the same as the diameter of the circle on which lie the orifices 18a in the tubes 18 through which the fuel is fed into the jet pipe 15. Thus, for instance, in the case of the construction shown in Figure 2 having two annular members 28 the smaller diameter annular member 28 has a diameter less than the circle on which the orifices 18a lie and the larger diameter annular member 28 has a diameter somewhat larger than the circle on which the orifices 18a lie. In use the annular members 28 produce stagnant or turbulent zones on their downstream sides and the stagnant or turbulent zones assist to maintain combustion in the jet pipe 15. The radial thickness of the annular members 28 is, however, smaller than is necessary to ensure completely stable combustion of the fuel and the following arrangement is employed to increase the effective area of the annular members.

The annular members 28 are made as hollow tubes having a pair of walls 28a, 28b, diverging in the direction of flow of exhaust gases through the jet pipe 15 and a plane downstream wall 28c and the interiors of the annular members are connected through one or more of the struts 29 to a pressure air supply pipe 30 through which pressure air is delivered to the struts 29 and thus to the tubular annular members 28. The annular members have formed in them adjacent the junctions of the wall 28c with the divergent walls 28a, and 28b a series of narrow slots 31, which slots extend circumferentially of the annular member 28 and provide outlets for the pressure air being fed into the annular member 28.

It is arranged that the pressure of the air supply to the annular members is such that the orifices afforded by the slots 31 are choked in operation, whereby the air forming the jets emerging from them has a velocity approximately equal to the velocity of sound. Moreover since the slots 31 are only separated by narrow necks 28d of metal the air jets issuing through the orifices 31 form substantially a continuous annular sheet-like jet. These air jets have the effect of increasing the effective area of the annular members as projected on a plane at right angles to the jet pipe axis and thus increase the stagnant or turbulent zones formed by the annular members, and the stability of combustion.

The compressed air may be supplied to the pipe 30 in any convenient manner, for instance, as shown in Figure 1 the pipe 30 may be connected with the delivery of the compressor 10 and a valve 32 will be provided in the pipe 30 to control the supply of compressed air to the annular members 28.

In use the valve 32 is opened only when fuel is being supplied to the jet pipe through the fuel supply means 18, 24, 27 and when the fuel supply is cut off so the supply of compressed air to the annular members 28 is cut off. In this way the "cold loss" in the jet pipe is less than would be the case if the annular members 28 had a projected area sufficient of themselves to produce stagnant or turbulent zones adequate to ensure stable combustion.

Referring now to Figures 4 and 5, there is illustrated another arrangement in which instead of the annular members 28 having slots such as the slots 31, the walls 28a and 28b are formed with slots 33 which are inclined at an acute angle to the direction of flow of exhaust gases through the jet pipe 15. With this form of annular member 28 a series of sheet-like jets are formed which are similar to a ring of guide vanes having an angle of attack to the flow of exhaust gases through the jet pipe 15.

Referring now to Figure 6, there is illustrated an alternative fuel supply arrangement and an alternative combustion stabilizing arrangement. In this case the fuel supply means and fuel stabilizing means are located at the apex end of the conical wall 14 in the exhaust unit.

The fuel supply means comprises a pilot fuel nozzle 34 at the extreme apex of the conical wall 14 surrounded by a small diameter cylindrical shroud 35, and a plurality of main fuel injectors in the form of perforated pipes 36 radiating from the apex of the concial wall 14 just upstream of the shroud 35. The pilot fuel is supplied to the pilot fuel nozzle 34 through a supply pipe 37 and the main fuel is fed to the perforated pipes 36 through a supply pipe 38. An electrical ignition device 39 is fitted within the shroud 35 to ignite the fuel issuing from the pilot fuel nozzle 34.

The combustion stabilizing means in this case comprises a number of semi-circular section annular baffles 40 carried on axially-extending supports 41 mounted on the apex of the conical wall 14, which baffles 40 have a diameter somewhat less than the diameter of the pitch circles on which lie the fuel outlet orifices 36a. The combustion stabilizing means also comprises means to form a number of air jets directed transversely to the direction of flow of the exhaust gases through the exhaust unit 13, 14. This means comprises a chamber 42 formed within the conical wall 14 by a wall 43, and the chamber 42 is supplied with compressed air by a pipeline 44, the compressed air conveniently being obtained from the delivery of the compressor 10 as described for the arrangement of Figures 2 and 3. A ring of apertures 45 is formed in the conical wall 14 just upstream of the shroud 35 and the apertures 45 open into the chamber 42. The size of the apertures 45 is selected in relation to the pressure of the air supply to the chamber 42, so that the flow of air through the apertures 45 is choked and the air jets have a velocity approaching that of sound, thus in effect providing a baffle for stabilizing combustion. As with the arrangement of Figures 2 and 5 the supply of compressed air to the chamber 42 will only be effected when fuel is being fed into the exhaust gases flowing through the exhaust unit 13, 14 and jet pipe 15.

In each of the above arrangements the air being supplied to form the air baffle may be preheated although it will be understood that if the air is tapped off from the engine compressor it will have been pre-heated by compression.

Referring now to Figure 7, there is illustrated an arrangement of reheat combustion equipment similar to that illustrated in Figure 2 except that in this case the combustion stabilizing means is combined with the pilot flame arrangement.

In this case the conical baffle 25 is blanked off at its downstream end by a plate 46 and a flame tube arrangement 47 is provided within the chamber so formed wherein fuel from the pilot fuel injector 24 is burned with air being supplied to the interior of the conical baffle 25 through a conduit 48 connected with the apex of the conical baffle 25. The outlet from the conical baffle 25 is afforded by a series of circumferentially-spaced slots 49 disposed so that the hot gases issuing from them are projected transversely to the exhaust gas flow through the jet pipe 15 so in effect creating a combustion stabilizing baffle. As in the previous constructions the supply of compressed air to the conical baffle 25 will only be effected during operation of the reheat combustion equipment so that the "cold loss" of the apparatus may be considerably reduced as compared with known arrangements employing mechanical baffles.

I claim:

1. A gas turbine engine comprising main combustion equipment, wherein air is heated by the burning of fuel therewith, a turbine connected to the main combustion equipment to receive the heated air thereby to be driven, a duct connected to the outlet side of said turbine to receive gases exhausting from said turbine as a high velocity gas stream, fuel injection means to deliver fuel into said duct to be burnt therein to reheat the high velocity gas stream, a source of air under pressure separate from said high velocity gas stream, and jet-producing means located within said duct downstream of said fuel injection means including a connection to said source to receive pressure air therefrom and including outlet passage means directed substantially at right angles to the direction of flow of the high velocity gas stream thereby to inject air in jet form penetrating the high velocity gas stream substantially at right angles to its direction of flow, said jet-producing means having a small projected area on a plane within the duct at right angles to the direction of flow of the high-velocity gas stream.

2. A gas turbine engine as claimed in claim 1, wherein said jet-producing means is adapted to produce an air jet of substantially annular form.

3. A gas turbine engine as claimed in claim 1, wherein said jet-producing means comprises an annular tubular member having a connection to said source of air under pressure and having in its walls a plurality of circumferentially-extending slots affording outlet passage means from the tubular member and arranged together to produce a substantially continuous annular sheet-like jet penetrating the high velocity gas flow substantially at right angles to the direction of its flow.

4. A gas turbine engine as claimed in claim 1, wherein said jet-producing means is adapted to produce a plurality of sheet-like jets inclined to the direction of flow of said high velocity gas stream in the manner of vanes.

5. A gas turbine engine as claimed in claim 1, wherein said jet-producing means comprises an annular tubular member having a connection to said source of compressed air and having in its walls a series of circumferentially-spaced slots which are inclined at acute angles to the direction of flow through said duct of said high velocity gas stream.

6. A gas turbine engine as claimed in claim 1, wherein said duct comprises an outer wall and a coaxial conical wall within the outer wall and wherein said jet-producing means comprises chamber-forming means within the apex end of said conical wall and a ring of outlet apertures from said chamber through said conical wall, said chamber being connected with said source of air under pressure.

7. A gas turbine engine as claimed in claim 6, comprising also a plurality of small diameter semi-circular section baffles located downstream of said conical wall and coaxially therewith.

8. A gas turbine engine as claimed in claim 1, wherein said jet-producing means comprises a conical wall located within said duct with its apex facing upstream with respect to the direction of flow of said high velocity gas stream, a base wall at the short end of said conical wall, there being radially-outwardly-facing orifices between the adjacent edges of said conical wall and said base wall, the space within said conical wall being fed with air under pressure from said source, and means to supply fuel to be burnt within said space.

9. A gas turbine engine as claimed in claim 1, comprising also means to control the supply of air under pressure from said source to said jet-producing means.

10. A gas-turbine engine comprising a compressor system, main combustion equipment, wherein air is heated by the burning of fuel therewith, a turbine connected to the main combustion equipment to receive the heated air thereby to be driven, a duct connected to the outlet side of said turbine to receive gases exhausting from said turbine as a high velocity gas stream, fuel injection means to deliver fuel into said duct to be burnt therein to reheat the high velocity gas stream, a tapping connection from said compressor system to provide a source of air under pressure separate from said high velocity gas stream, and jet-producing means located within said duct downstream of said fuel injection means including a connection to said source of air under pressure to receive pressure air therefrom and also including outlet passage means directed substantially at right angles to the direction of flow of the high velocity gas stream thereby to inject air in jet form into said high velocity gas stream to penetrate it substantially at right angles to its direction of flow, said jet-producing means having a small projected area on a plane within the duct at right angles to the direction of flow of the high velocity gas stream.

References Cited in the file of this patent

UNITED STATES PATENTS

| | | |
|---|---|---|
| 2,206,553 | Nagel | July 2, 1940 |
| 2,508,420 | Redding | May 23, 1950 |
| 2,525,206 | Clarke | Oct. 10, 1950 |
| 2,572,723 | Hildestad | Oct. 23, 1951 |
| 2,601,000 | Nerad | June 17, 1952 |
| 2,622,396 | Clarke | Dec. 23, 1952 |
| 2,630,673 | Woll | Mar. 10, 1953 |

FOREIGN PATENTS

| | | |
|---|---|---|
| 499,468 | Belgium | Mar. 16, 1951 |